United States Patent
Livarance et al.

(10) Patent No.: US 9,411,604 B2
(45) Date of Patent: Aug. 9, 2016

(54) BOOTING A COMPUTING DEVICE TO HAVE A PREDEFINED FUNCTIONALITY

(75) Inventors: Fletcher Livarance, Kent, OH (US); Timothy J Freese, Niwot, CO (US); William C Bredbenner, Wynnewood, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 14/006,714

(22) PCT Filed: Apr. 1, 2011

(86) PCT No.: PCT/US2011/130962
§ 371 (c)(1),
(2), (4) Date: Sep. 23, 2013

(87) PCT Pub. No.: WO2012/134499
PCT Pub. Date: Oct. 4, 2012

(65) Prior Publication Data
US 2014/0013096 A1 Jan. 9, 2014

(51) Int. Cl.
*G06F 9/445* (2006.01)
*G06F 9/44* (2006.01)

(52) U.S. Cl.
CPC ............ *G06F 9/4406* (2013.01); *G06F 9/4416* (2013.01)

(58) Field of Classification Search
CPC ............................ G06F 9/4416; G06F 9/4406
See application file for complete search history.

(56) References Cited

U.S. PATENT DOCUMENTS

| | | |
|---|---|---|
| 2003/0023839 A1 | 1/2003 | Burkhardt et al. |
| 2006/0059327 A1 | 3/2006 | Brown et al. |
| 2007/0043938 A1* | 2/2007 | May ...................... G06F 9/4401 713/2 |
| 2007/0256070 A1* | 11/2007 | Bykov ...................... G06F 8/60 717/174 |
| 2007/0260868 A1* | 11/2007 | Azzarello ............. G06F 9/4406 713/2 |
| 2008/0005133 A1 | 1/2008 | Khalidi et al. |

(Continued)

FOREIGN PATENT DOCUMENTS

| | | |
|---|---|---|
| CN | 1405780 | 3/2003 |
| CN | 101438266 | 5/2009 |

(Continued)

OTHER PUBLICATIONS

"Concept of DynaOS—Dynamic Operating System—an OS That Can Boot from Remote Server" <http://www.hoozi.com/post/640pi/concept-of-dynaos-dynamic-operating-system-an-os-that-can-boot-from-remote-server>.

(Continued)

*Primary Examiner* — Albert Wang
(74) *Attorney, Agent, or Firm* — Brooks, Cameron & Huebsch

(57) ABSTRACT

In a method for booting a computing device to have a predefined functionality, in which the computing device has stored thereon a limited functionality operating system (OS) having an operating file system, the limited functionality OS is booted and a characteristic file system with a predefined functionality is located. In addition, the characteristic file system is merged into the operating file system and the limited functionality OS is implemented with the merged file system to cause the computing device to have the predefined functionality.

13 Claims, 4 Drawing Sheets

(56) References Cited

U.S. PATENT DOCUMENTS

| | | | |
|---|---|---|---|
| 2008/0126785 A1* | 5/2008 | Chong | G06F 9/4401 713/2 |
| 2009/0089569 A1 | 4/2009 | Baribault et al. | |
| 2009/0094596 A1 | 4/2009 | Kuiper et al. | |
| 2009/0276524 A1 | 11/2009 | Ohtani | |
| 2009/0292912 A1 | 11/2009 | Kim et al. | |
| 2010/0262638 A1 | 10/2010 | Fitzgerald | |

FOREIGN PATENT DOCUMENTS

| | | |
|---|---|---|
| CN | 101490645 | 7/2009 |
| FR | 2911203 | 7/2008 |
| WO | WO-2008008675 | 1/2008 |

OTHER PUBLICATIONS

Eeles, Peter, "Layering Strategies", <http://rup.hops-fp6.org/papers/pdf/tp199_layering_strategies.pdf>.

International Search Report, Mar. 22, 2012, Korean IPO, PCT Patent Application No. PCT/US2011/030962.

* cited by examiner

BOOTING A COMPUTING DEVICE TO HAVE A PREDEFINED FUNCTIONALITY

BACKGROUND

The use of single purpose electronic devices has been greatly expanding in the past few years, and is expected to be a significant growth market in years to come. Currently these devices are a disparate collection of incompatible hardware running a wide variety of operating systems and software. Interchangeability is near 0% even though a large number of these devices have very similar hardware specifications.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
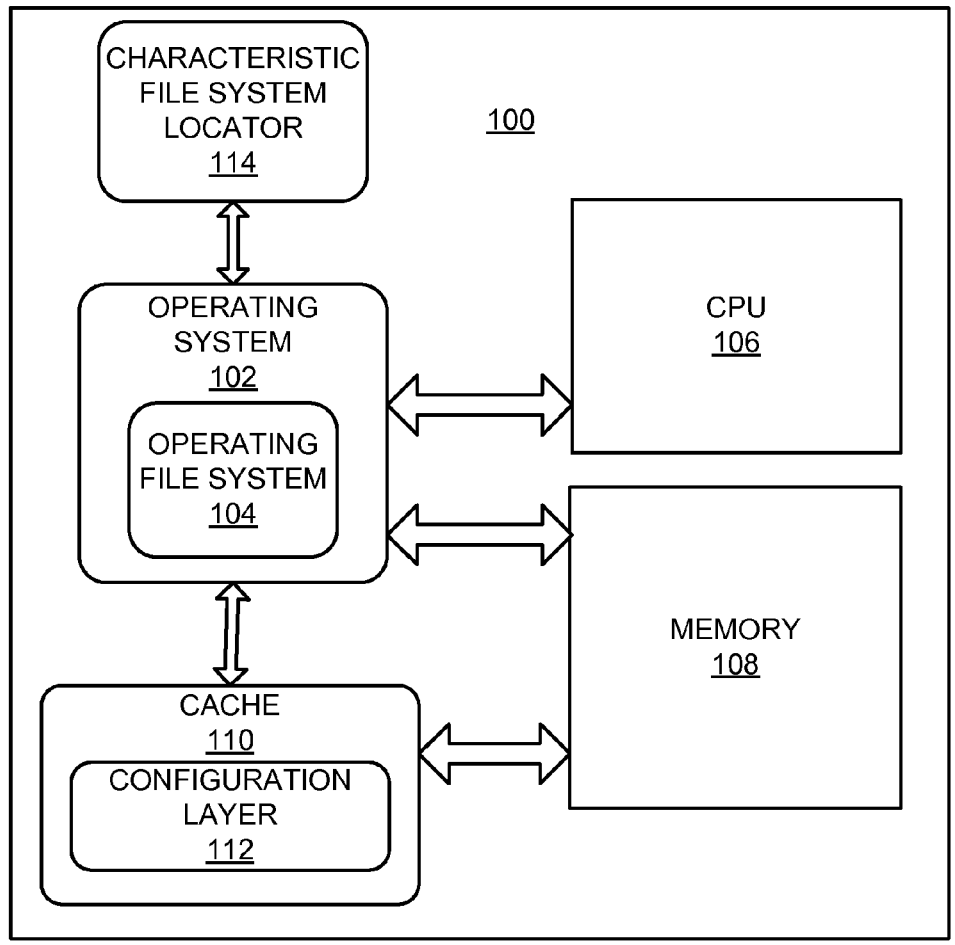
FIG. 1A shows a functional block diagram of a computing device, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are a method, apparatus, and computer readable storage medium for booting a computing device to have a predefined functionality, in which the computing device has stored thereon a limited functionality operating system (OS). During a boot up process of the computing device, a characteristic file system with a predefined functionality is located. The characteristic file system may include services, libraries, configurations, tasks, and applications associated with the predefined functionality. In addition, the characteristic file system is merged into the operating file system of the limited functionality OS. The limited functionality OS is implemented with the merged file system to cause the computing device to have the predefined functionality.

Typically, updates for single purpose electronic devices occur via a manual installation/uninstallation process in which applications are installed individually via a manual or partially automated fashion, with individual checks to ensure dependencies are met and that previous versions are removed. This process is often tedious and prone to error and incompatibility issues. Other approaches rely primarily on text based configuration files, manual setup of dynamic host configuration protocol (DHCP) tags and whole image updates. However, a large drawback to these approaches is that the entire operating system (frequently hundreds of megabytes or gigabytes) must be downloaded on boot.

Through implementation of the method, apparatus, and computer readable storage medium disclosed herein, the limited functionality OS is implemented with a layered file system design that includes an operating file system and a characteristic file system. The characteristic file system may be removed if the characteristic file system becomes corrupted or when a new characteristic file system is to be installed, essentially reverting the limited functionality OS to factory defaults. The disclosure substantially improves download/install time of the characteristic file system as the operating file system contains additional libraries/drivers/applications used by all characteristic files systems, so that the characteristic file system need only contain the additional libraries/applications needed to introduce a predefined functionality beyond the limited functionalities of the OS. Additionally, the characteristic file system may be a pre-installed file system that is appended to the operating file system rather than requiring installation/setup. The limited functionality OS may be stored as a read only file that is protected from possible damage or corruption due to updates, power-offs, or malware because updates occur only in the characteristic file system. Further, a pull-based update mechanism may be employed that allows the limited functionality OS to automatically detect and perform updates to the characteristic file system without having to perform any additional configurations.

FIG. 1A is a functional block diagram of a computing device 100, according to an example of the disclosure. As depicted in FIG. 1A, the computing device 100 includes an operating system (OS) 102, a central processing unit (CPU) 106, a memory 108, a cache 110, and a characteristic file system locator 114. It should be understood that the computing device 100 depicted in FIG. 1A may include additional components and that some of the components described herein may be removed and/or modified without departing from a scope of the computing device 100. For example, the OS 102 may control additional hardware devices in addition to the CPU 106 and the memory 108 shown in FIG. 1A.

Figure 1B:
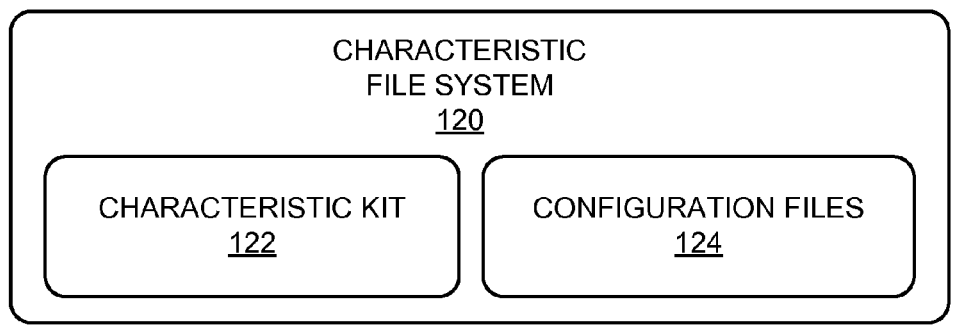
FIG. 1B shows a diagram of a characteristic file system, according to an example of the present disclosure.

The computing device 100 is an apparatus that includes a limited functionality operating system (OS) 102. The characteristic file system locator 114 is to locate a characteristic file system 120 (FIG. 1B) and to load the characteristic file system 120 into the cache 110 or the memory 108. The characteristic file system 120 has a predefined functionality and includes a set of services, libraries, configurations, tasks, applications, etc., that are associated with the predefined functionality. A predefined functionality is a computing experience that includes launched services, desktop, control panel items, applications, etc. that are available on the computing device 100. The predefined functionality of the computing device 100 for a particular task-based purpose may include functionality appropriate to that task-based purpose. The characteristic file system 120, as shown in FIG. 1B, includes a characteristic kit 122 and configuration files 124. The characteristic kit 122 provides the libraries, tasks, and applications, and the configuration files 124 provide settings and configurations for the characteristic kit 122 and the OS 102. According to an example, the characteristic file system 120 contains only the additional libraries/applications, etc., needed to introduce functionality appropriate to the computing device for that task-based purpose beyond the limited functionality contained in the OS 102.

The OS 102 is a limited functionality operating system that organizes and controls hardware resources in the computing device 100 and comprises machine-readable instructions and data. The OS 102 may include functionality required to run various limited applications without a characteristic file system 120 (and corresponding predefined functionality) installed, which may include, for instance, applications for locating and installing the characteristic file system 120 using the characteristic file system locator 114 as described hereinbelow. The hardware resources controlled by the OS 102 may include, for instance, processor capacity for the CPU 106 and other processors, disk space, network connections, memory, power supply, display devices, input/output bandwidth, etc.

The OS 102 includes an operating file system 104 that contains libraries and tools that may be used to provide a plurality of different predefined functionalities, such as but not limited to, mouse/keyboard support applications, a graphical user interface (GUI) library, display management tools, audio management tools, multimedia libraries, and networking support. More particularly, the OS 102 (and the operating file system 104) includes limited functionality that overlaps among computing devices with a plurality of different predefined functionalities. By way of particular example, the OS 102 may provide support for a plurality of predefined functionalities, which may correspond to task-based purposes, such as, but not limited to, point-of-sale (POS), video game, kiosk, set top box, microwave control, refrigerator control, hiring station, tire center data entry and other uses.

As discussed in greater detail herein below, the OS 102 may have the limited functionality until the characteristic file system 120 is merged into the operating file system 104. The characteristic file system 120 may be merged into, or appended onto, the operating file system 104 in a manner that does not require installation/setup. For instance, the characteristic file system 120 may be merged into the operating file system 104 using a union file system.

A plurality of computing devices similar to the computing device 100 may be installed at different locations, loaded with appropriate characteristic file systems 120, and used to perform different tasks. The computing device 100 may use interchangeable characteristic file systems 120 to rewrite/retune the computing device 120 to run/boot/install only the computing resources that are required to perform a particular task or set of tasks associated with a particular predefined functionality.

The characteristic file system locator 114 may locate the appropriate characteristic file system 120 for each predefined functionality. The characteristic file system locator 114 may comprise a module, such as a software module, hardware module, or a combination of software and hardware modules. Thus, in one example, the module (characteristic file system locator 114) comprises a circuit component. In another example, the module (characteristic file system locator 114) comprises machine-readable code stored on a computer readable storage medium, which is executable by a processor.

Figure 1C:
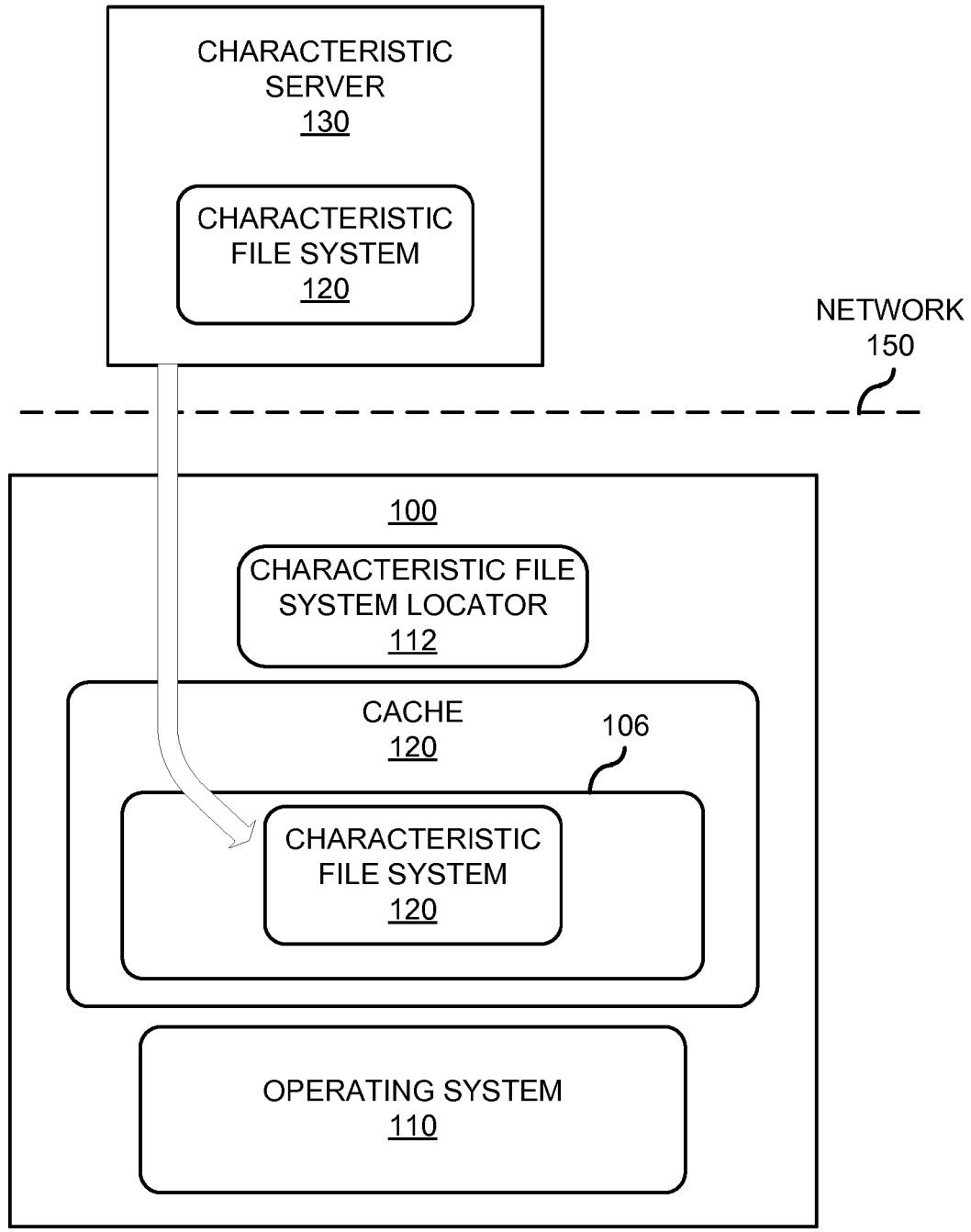
FIG. 1C shows a functional block diagram of updating a characteristic file system on a computing device, according to an example of the present disclosure.

According to an example, and as described with respect to FIG. 1C, the characteristic file system locator 114 is to retrieve an Internet protocol (IP) address via dynamic host configuration protocol (DHCP) and begins searching for a characteristic server 130 using an automatic network update client (not shown). The characteristic file system locator 114 may locate the characteristic server 130 using processes such as, but not limited to, DHCP tags and broadcasting. The characteristic file system locator 114 may check the located characteristic server 130 for characteristic file systems 120. In instances in which a characteristic file system 120 that is to replace the current characteristic file system is located on the characteristic server 130, the characteristic file system 120 is downloaded and cached (for instance in the configuration layer 112 of the cache 110 shown in FIG. 1A) in local storage on the computing device 100. The characteristic file system 120 may be changed, upgraded or downgraded by placing the characteristic file system 120 that is to replace the current characteristic file system on the characteristic server 130. At the next logout/reboot of the computing device 100, the characteristic file system locator 114 may detect that the characteristic file system 120 has changed and download the new characteristic file system 120.

According to an example, the OS 102 also receives configuration files 124 and installs the configuration files 124 into the configuration layer 112 in instances in which changes are to be implemented. The configuration files 124 may be created by an advanced configuration editor (not shown) on the characteristic server 130 based on selections an administrator of the computing device 100 and/or characteristic server 130 has made. These selections may include a particular characteristic file system 120, a particular characteristic server to connect to, etc. The configuration files 124 are input to the computing device 100 and installed in a manner that the OS 102 and characteristic file system 120 may identify information in the configuration files 124 and use the information to define settings for the OS 102 (including the operating file system 104) and the characteristic file system 120. Additionally, the OS 102 may include a pull based update mechanism that allows the OS 102 to automatically detect and perform updates to the characteristic file system 120 without having to perform any additional configuration, substantially simplifying distribution of the characteristic file system 120.

According to another example, the characteristic file system 120 may be stored on a storage device, such as, a universal serial bus (USB) storage device, a compact disk, an external hard drive, etc., and may be provided to the computing device 100 through a direct connection of the storage device to the computing device. The characteristic file system locator 114 in this instance indicates that the characteristic file system 120 is included on the storage device and may also provide a protocol for merging the characteristic file system 120 onto the operating file system 104. According to yet another example, the characteristic file system 120 is stored in a separate cache on the computing device 100. The characteristic file system locator 114 in this instance may comprise pointers to the characteristic file system 120.

The size of the characteristic file system 120 may be substantially reduced, for instance when compared to an operating system image used in some current approaches to updating single purpose electronic devices, and the installation of the characteristic file system 120 may be of the order of a few seconds to provide a completely customizable graphical desktop. The OS 102 may also be substantially reduced in size, containing minimum needed to support the hardware of the computing device 100, retrieve an IP, contact a characteristic server 130 and launch a splash screen, as well as some libraries/tools that will be used across all connection types.

The processor 106 may remove the characteristic file system 120 in instances in which the characteristic file system 120 becomes corrupted or a new characteristic file system 120 is to be installed. In this instance, the OS 102 may revert to factory defaults. Alternately, the characteristic file system 120 may be removed and replaced with a new characteristic file system 120. According to an example, the OS 102 is stored entirely within a read-only compressed file system. By storing the OS 102 in the read only compressed file system, the OS 102 is protected from possible damage or corruption due to updates, power-offs, malware, etc., since, for instance, updates may occur only in the characteristic file system 120. In addition, installation and uninstallation of the characteristic file system 120 may be performed without risk of registry corruption or file corruption on the OS 102.

According to an example, the OS 102, the characteristic file system locator 114, and the characteristic file system 120 each comprise machine readable instructions that may be stored, for instance, in a volatile or non-volatile memory, such as DRAM, EEPROM, MRAM, flash memory, floppy disk, a CD-ROM, a DVD-ROM, or other optical or magnetic media, and the like. The machine readable instructions may be stored in the memory, such as the memory 108, which are executable by a processor 106 of the computing device 100. According to another example, each of the OS 102, the characteristic file system locator 114, and the characteristic file system 120 comprise at least one hardware device, such as, a circuit or multiple circuits arranged on a board.

Figure 2:
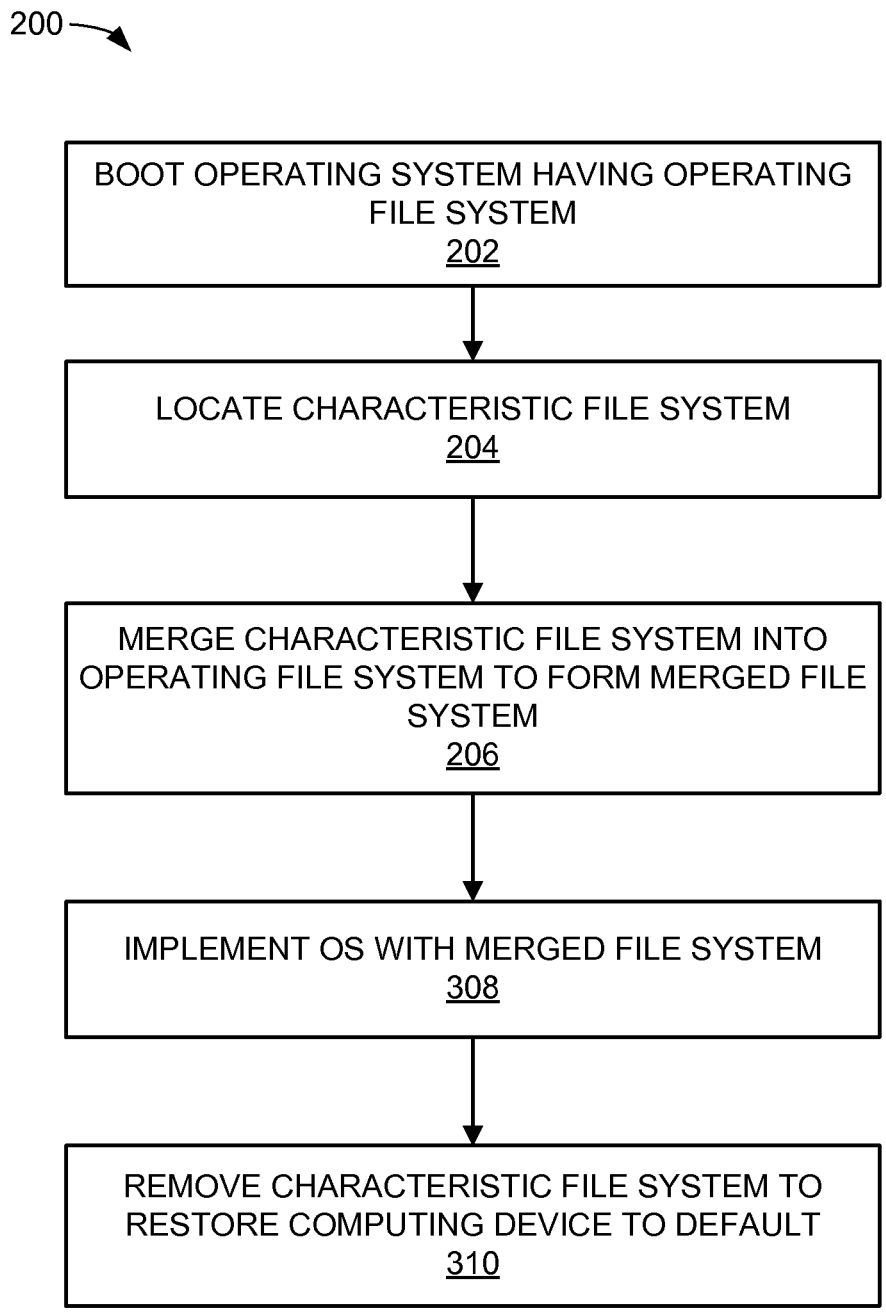
FIG. 2 depicts a flow diagram of a method for booting a computing device, according to another example of the present disclosure.

Various manners in which the computing device 100 may operate are discussed with respect to the method 200 depicted in FIG. 2 and the diagram 200. It should be readily apparent that the method 200 depicted in FIG. 2 represents a generalized illustration and that other elements may be added or existing elements may be removed, modified or rearranged without departing from the scope of the method 200.

As shown in FIG. 2, there is shown a flow diagram of a method for booting a computing device having operating system, such as the computing device 100 depicted in FIG. 1, according to an example. It should be apparent that the method 200 represents a generalized illustration and that other processes may be added or existing processes may be removed, modified or rearranged without departing from a scope of the method 200.

At block 202, an OS 102 having an operating file system 104 is booted, for instance by the processor 106. The OS 102 is a limited functionality OS that that includes libraries and tools usable by the computing device 100 with a plurality of different predefined functionalities. A predefined functionality of the computing device 100 includes at least one of launched services, desktop, control panel items and applications. For instance, the predefined functionality of the computing device 100 may include basic components needed to run applications on the computing device 100 without a user interface being installed thereon.

At block 204, a characteristic file system 120 is located, for instance by the characteristic file system locator 114. The characteristic file system 120 may include services, libraries, configurations, tasks applications, etc., associated with a predefined functionality. For instance, the characteristic file system 120 may be located as being available over a network 150, from a storage device, from a cache of the computing device 100, etc. According to an example, the characteristic file system server may automatically locate a characteristic server 130 using DHCP, connect to the characteristic server 130 and download the characteristic file system 120 from the characteristic server 130. At block 204, the characteristic file system 120 may also be downloaded, transferred, copied, etc., onto the memory 108 or cache 110 of the computing device 100.

According to an example, the OS 102 executes a predefined start process that is implemented individually within each characteristic file system 120 and merges the characteristic file system 120 into the operating file system 104. The merged file system completes the functionality of the OS 102.

At block 206, the characteristic file system 120 is merged into the operating file system 104, for instance, by the OS 102. According to an example, the characteristic file system 120 is merged into the operating file system 104 by accessing a unification file system (not shown) and using the unification file system to merge the characteristic file system 120 into the operating file system 104. The unification file system may be a component of the computing device 100 that is designed to merge multiple source file systems into a single working file system.

At block 208, the OS 102, with the merged file system, is implemented to have a predefined functionality, for instance, by the CPU 106. The merged file system completes the functionality of the OS 102. The computing device 100 in this instance has a predefined functionality that is based upon the characteristic file system 120.

According to an example, the computing device 100 is implemented with the merged file system to provide client services, web services, a universal serial bus (USB) redirection service, a client update service, a taskbar, a window manager, a desktop background drawing tool, a remote printer mapping application, a customized login window, specialized system initialization scripts, an integrated application for changing system volume, etc.

At block 210, the characteristic file system 120 may be removed to restore the OS 102 to a default state, for instance by the processor 106. The default state may comprise a state of the computing device 100 prior to merging the characteristic file system 120 into the operating file system 104.

Some or all of the operations set forth in the method 200 may be contained as a utility, program, or subprogram, in any desired computer accessible medium. In addition, the method 200 may be embodied by computer programs, which may exist in a variety of forms both active and inactive. For example, they may exist as machine readable instructions, including source code, object code, executable code or other formats. Any of the above may be embodied on a computer readable storage medium.

Examples of computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 3:
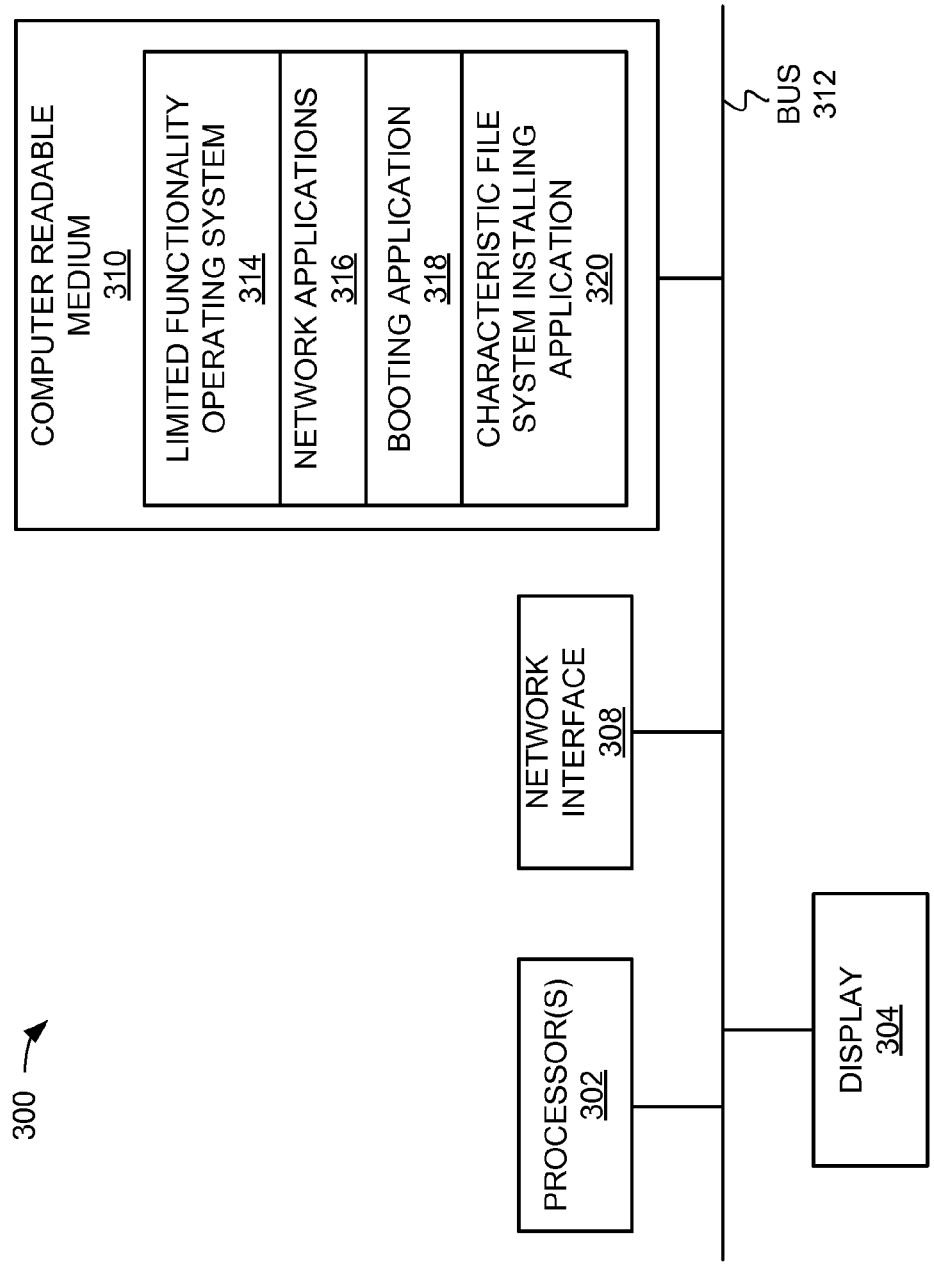
FIG. 3 illustrates a schematic representation of the computing device depicted in FIGS. 1A and 1C, which may be employed to perform various functions described herein, according to an example of the present disclosure.

Turning now to FIG. 3, there is shown a schematic representation of the computing device 100 depicted in FIGS. 1A and 1C, configured in accordance with an example of the present disclosure. The device 100 includes a processor 302, such as the central processing unit 106; a display device 304, such as a monitor; a network interface 308, such as a Local Area Network LAN, a wireless 802.11x LAN, a 3G mobile WAN or a WiMax WAN; and a computer-readable medium 310, such as the memory 108. Each of these components is operatively coupled to a bus 312. For example, the bus 312 may be an EISA, a PCI, a USB, a FireWire, a NuBus, or a PDS.

The computer readable medium 310 may be any suitable medium that participates in providing instructions to the processor 302 for execution. For example, the computer readable medium 310 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 310 may also store other machine readable instructions, including word processors, browsers, email, Instant Messaging, media players, and telephony machine-readable instructions.

The computer-readable medium 310 may store a microprocessor that is capable of running an embedded real-time operating system (RTOS), such as Linux or Unix, and, based on architecture may also support desktop OSes such as Ubuntu, Windows or Mac; network applications 316; and a booting application 318. The limited functionality operating system 314 may be multi-user, multiprocessing, multitasking, multithreading, real-time and the like. The limited functionality operating system 314 may also perform basic tasks such as recognizing input from input devices, such as a keyboard or a keypad; sending output to the display 304; keeping track of files and directories on the computer readable medium 310; controlling peripheral devices, such as disk drives, printers, image capture device; and managing traffic on the bus 312. The network applications 316 include various components for establishing and maintaining network connections, such as machine readable instructions for implementing communication protocols including TCP/IP, HTTP, Ethernet, USB, and FireWire.

The booting application 318 provides various components for booting an operating system, as described above. In certain examples, some or all of the processes performed by the application 318 may be integrated into the limited functionality operating system 314. In certain examples, the processes may be at least partially implemented in digital electronic circuitry, or in computer hardware, machine readable instructions (including firmware and/or software), or in any combination thereof. The characteristic file system installing application 320 provide instructions for locating a characteristic file system that may include services, libraries, configurations, tasks and applications associated with a predefined functionality. In addition, the characteristic file system installing application 320 provides components for merging the characteristic file system into the operating file system of the limited functionality operating system 314.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims —and their equivalents —in which all terms are meant in their broadest reasonable sense unless otherwise indicated.

What is claimed is:

1. A method for booting a computing device to have a predefined functionality, said computing device having stored thereon a limited functionality operating system (OS) having an operating file system, said method comprising:
   booting the limited functionality OS;
   locating a characteristic file system with a predefined functionality;
   loading the characteristic file system into a non-volatile storage device that is different than a storage device on which the limited functionality OS is stored on;
   merging the characteristic file system into the operating file system;
   implementing, by a processor, the limited functionality OS with the merged file system to cause the computing device to have the predefined functionality; and
   removing the characteristic file system to restore the limited functionality OS to a state prior to merging the characteristic file system into the operating file system.

2. The method according to claim 1, wherein the limited functionality OS is stored entirely within a read-only compressed file system.

3. The method according to claim 1, wherein the predefined functionality includes services, libraries, configurations, tasks and applications.

4. The method according to claim 1, wherein merging the characteristic file system into the operating file system further comprises using a unification file system to merge the characteristic file system into the operating file system.

5. The method according to claim 1, wherein locating the characteristic file system comprises:
   automatically locating a characteristic server using dynamic host configuration protocol (DHCP), wherein the characteristic server includes the characteristic file system;
   connecting to the characteristic server; and
   downloads the characteristic file system from the characteristic server.

6. The method according to claim 1, wherein the operating file system includes libraries and tools usable by the computing device with a plurality of different characteristic file systems.

7. The method according to claim 1, wherein the characteristic file system includes configuration files, and wherein merging the characteristic file system further comprises merging the configuration files into the operating file system.

8. A computing device comprising:
   a memory storing a limited functionality operating system (OS) having an operating file system;
   a characteristic file system locator to locate a characteristic file system with a predefined functionality; and
   a processor to:
      load the characteristic file system into a non-volatile storage device that is different than a storage device on which the limited functionality OS is stored on;
      implement a boot-up of the limited functionality OS and to merge the characteristic file system into the operating file system to enable the limited functionality OS to have a predefined functionality; and
      remove the characteristic file system to restore the limited functionality OS to a state prior to merging the characteristic file system into the operating file system.

9. The computing device according to claim 8, wherein the limited functionality OS is stored entirely within a read-only compressed file system.

10. The computing device according to claim 8, wherein the processor is further to access a unification file system and to use the unification file system to merge the characteristic file system into the operating file system.

11. The computing device according to claim 8, wherein the characteristic file system locator is further to automatically locate a characteristic server using dynamic host configuration protocol (DHCP), wherein the characteristic server includes the characteristic file system, connect to the characteristic server, and download the characteristic file system from the characteristic server.

12. The computing device according to claim 8, wherein the operating file system includes libraries and tools usable by the computing device with a plurality of different characteristic file systems.

13. A non-transitory computer readable storage medium on which is embedded a computer program, said computer program implementing a method for booting a computing device to have a predefined functionality, said computing device having stored thereon a limited functionality operating system (OS) having an operating file system, said computer program comprising computer readable code to:

boot the limited functionality OS;

locate a characteristic file system with a predefined functionality;

load the characteristic file system into a non-volatile storage device that is different than a storage device on which the limited functionality OS is stored on;

merge the characteristic file system into the operating file system;

implement the limited functionality OS with the merged file system, wherein the limited functionality OS implements the merged file system to have the predefined functionality; and removing the characteristic file system to restore the limited functionality OS to a state prior to merging the characteristic file system into the operating file system.

* * * * *